United States Patent Office 3,317,580
Patented May 2, 1967

3,317,580
DIBORADIOXANES AND PROCESS FOR PREPARING DIBORADIOXANES AND BORONIC ACIDS
Melville E. D. Hillman, Richmond, Calif., assignor to E. I. du Pont de Nemours and Company, Wilmington, Del., a corporation of Delaware
No Drawing. Filed June 4, 1962, Ser. No. 199,587
9 Claims. (Cl. 260—462)

This invention relates to a process and, more particularly, to a process for preparing organic boron compounds and certain of such compounds obtained thereby.

Boron derivatives have attracted particular interest recently for use as gasoline additives. The esters of boronic acid, for example, are useful as gasoline additives for increasing octane number. Anhydrides obtained from boronic acids can be oxidized to give carbinols, which carbinols find utility, for example, in the synthesis of esters for use as high-temperature lubricants.

This invention provides a method for obtaining boronic acids and derivatives thereof as well as certain other novel boron compounds in high yields.

The process of this invention comprises heating a borane of the formula $R_3B$ wherein R is a 1 to 12 carbon radical bonded to boron through aliphatic carbon with carbon monoxide in the presence of water.

In the boranes used in the above reaction, R can be, for example, alkyl such as ethyl, propyl, isopropyl, butyl, isobutyl, secondary butyl, amyl, isoamyl, n-hexyl, n-octyl, n-nonyl, n-decyl, n-undecyl or n-dodecyl; cycloalkyl such as cyclohexyl or cyclopentyl (cycloalkyl) alkyl such as cyclohexylmethyl or cyclohexylethyl, or aralkyl, for example, phenylethyl or phenylpropyl. The three R substituents on the boron can be same or different. R is preferably a hydrocarbon, free of ethylenic unsaturation, especially alkyl. Illustrative boranes useful in the process of this invention include, for example, triethylborane, tripropylborane, triisopropylborane, tri-n-butylborane, triisobutylborane, tri-n-amylborane, triisooctylborane, tri-n-decylborane, tri-n-dodecylborane, cyclohexylmethyldiethylborane, methyldiethylborane, dimethylethylborane and diethylpropylborane as well as mixtures thereof.

The predominant product obtained in accordance with the process of this invention depends to a large extent upon the particular reaction temperature employed. At low temperatures, for example, at temperatures ranging from about 25° C. to 125° C., novel diboradioxanes are obtained by the process of this invention according to the following equation

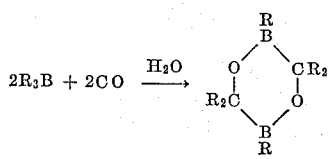

wherein R has the meaning specified hereinbefore, namely, a 1 to 12 carbon atom radical bonded to the ring through aliphatic carbon. The preferred diboradioxanes are those in which R represents a hydrocarbon radical, free of ethylenic unsaturation, especially an alkyl radical.

If the aforementioned diboradioxanes of this invention are heated in water at higher temperatures, for example, about from 125 to 200° C., boronic acids are obtained according to the equation:

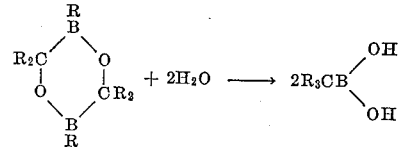

Boronic acids can also be obtained as the predominant reaction product in accordance with the process of this invention by carrying out the reaction directly at a temperature of 125 to 200° C. or even higher, according to the following equation:

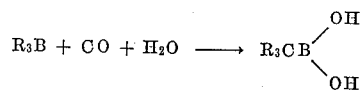

At reaction temperatures above 100° C., boronic acids tend to lose water to form boronic anhydrides according to the following equation:

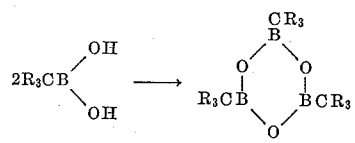

In fact, when a reaction mixture containing a boronic acid is distilled, the distillate contains boronic anhydride instead of the boronic acid per se, the acid being dehydrated under the distillation conditions.

The temperature of reaction of the CO with the borane can vary widely, i.e., from about 20° C. to about 200° C. At about 20° C. to about 100° C. the formation of 2,5-diboradioxanes is favored. At higher temperatures, i.e., from about 125° to about 200° C. and higher the formation of boronic acids is favored. In the range between about 100° C. and about 125° C. mixtures of the two products are obtained.

The preferred range of temperature for obtaining diboradioxanes is from about 25° C. to about 75° C. The preferred temperature range for obtaining boronic acids or anhydrides is from about 140° C. to about 175° C. As indicated hereinbefore the diboradioxanes can be converted to boronic acids by heating in water at about 125° C. to about 200° C.

The pressures used in the present invention can also vary widely, i.e., from about 1 atmosphere to about 1000 atmospheres. Pressures higher than the latter can be used but the equipment for withstanding such high pressures is inordinately expensive. The preferred range of pressure is from about 100 atmospheres to about 900 atmospheres. This pressure can be obtained with CO alone or by CO diluted with a suitable inert gas. Obviously, the partial pressure of the CO must be high enough during the reaction, for example, at least about 1 atmosphere, to obtain a reasonable reaction rate.

The weight ratio of water used in the reaction medium to the borane can also vary widely, i.e., from about 0.5 to about 10 or higher. The preferred ratio of water to trialkylborane is from about 0.75 to about 5.0. The water can also be admixed with non-reactive miscible and immiscible solvents such as acetone, dioxane, ether, alcohol, n-pentane and mixtures thereof. The preferred reaction medium, however, is water alone.

The reaction time is selected so that at least 80% of the borane is converted to diboradioxane or boronic acid. This time will be completely determined by the reaction temperature and pressure of CO.

The products of the present invention are isolated by conventional means. The diboradioxanes are generally isolated by distillation from the reaction product, after separation of the organic phase from the water in the reaction medium. When boronic acids are the product, distillation generally gives the boronic anhydride instead of the boronic acid, the acid being dehydrated under the distillation conditions.

The organic boron compounds obtained in accordance with this invention are useful as gasoline additives to improve octane number. Boronic anhydrides can be oxidized to tertiary carbinols which, in turn, can be reacted with acids, for example, aliphatic dicarboxylic acids, to yield high-temperature lubricants. The process of this invention is characterized by the high yields, often up to 98%, of boric acids, anhydrides thereof, and diboradioxanes obtained thereby.

The invention is illustrated by the following examples. Parts and percentages where given are by weight.

*Example 1*

A stainless steel reaction vessel is charged with 70 parts of water and 50 parts of triethylborane. The vessel is pressurized to 200 atmospheres with CO. The temperature spontaneously increases to 37° C. The pressure of CO is increased to 700 atmospheres and the temperature to 50° C. and the mixture is agitated for one hour under these conditions. The vessel is then cooled and the contents removed. The organic phase is separated, dried over anhydrous $MgSO_4$ and distilled. 2,3,3,5,6,6-hexaethyl-2,5-diboradioxane (61.1 parts, 95% yield), a white, waxy solid boiling at 110°–114° C. at 10 mm. is obtained. Elemental analysis shows 66.8% carbon, 12.01% hydrogen and 8.69% boron. The theoretical values for 2,3,3,5,6,6-hexaethyl-3,5-diboradioxane are 66.42% carbon, 12.04% hydrogen and 8.48% boron. The molecular weight is 251 as compared with the theoretical value of 253.

The above process is repeated under varying temperature and pressure to give the results listed in the table below:

| Temperature (° C.) | Pressure (atmospheres) | Yield (percent) |
|---|---|---|
| 125 | 700 | 88 |
| 76 | 500 | 89 |
| 50 | 1 | 90 |

The above process is repeated at 750 atmospheres pressure and 40° C. and using a mixture of 60 parts of acetone with 15 parts of water as the reaction medium instead of water alone. The yield of hexaethyldiboradioxane is 95%.

*Example 2*

A stainless steel vessel is charged with 75 parts of water and 61.5 parts of triethylborane. The vessel is pressurized with 700 atmospheres of CO and the temperature is raised to 150° C. where agitation is continued for 2 hours. The vessel is then cooled and the organic layer separated and dried over $CaSO_4$. Distillation gives 72.2 parts (91% yield) of triethylcarbinyl boronic anhydride, boiling at 105–145 at 0.6 mm., identified by infrared spectroscopy.

*Example 3*

The procedure of Example 1 is used substituting 60 parts of tri-n-butylboron for the triethylboron, the vessel is heated for 3 hours at 75° C. and under 700 atmospheres pressure of CO. 2,3,3,5,6,6-hexa-n-butyl-2,5-diboradioxane is obtained boiling at 153–155° C. at 0.7 mm. pressure in 73% yield.

The above procedure is repeated at a temperature of 150° C. for 2 hours. Tri-n-butylcarbinylboronic anhydride (236.1 parts) is treated with 400 parts of 6 N sodium hydroxide and 230 parts of 30% hydrogen peroxide at room temperature for 15 hours and then is heated at reflux for 30 minutes. The reaction mixture is cooled and the organic layer is separated and dried over $MgSO_4$. Distillation gives 216.5 parts (96% yield) of tri-n-butyl-carbinol boiling at 80–95° C. at 0.5 mm.

*Examples 4, 5, 6, 7, and 8*

The general procedure of Example 1 is used under the conditions and giving the results described in the table below:

| Example No. | Alkylboron Used | Temp., ° C. | Time (hrs.) | Pressure (atm.) | Product Obtained | Yield, percent | Boiling Point (° C.) |
|---|---|---|---|---|---|---|---|
| 4 | Tri-isobutyl | 75 | 4 | 500 | Hexaisobutyl diboradioxane | 81 | 123-8° at 10.3 mm. |
| 5 | Tri-n-hexyl | 50 | 2 | 900 | Hexa-n-trihexyl diboradioxane | 94 | Above 110° at 0.5 mm. |
| 6 | ---do--- | 150 | 2 | 900 | Trihexyl carbinyl boronic anhydride | 96 | Above 150° at 0.6 mm. |
| 7 | Tri-n-octyl | 50 | 1.5 | 900 | Hexaoctyl diboradioxane | 89 | Above 100° at 0.5 mm. |
| 8 | ---do--- | 150 | 2 | 900 | Trioctylcarbinyl boronic anhydride | 68 | Above 180° at 0.8 mm. |

When tribenzylborane, tricyclohexylborane or tri(cyclohexylmethyl) borane are reacted with CO under the conditions of Example 5, similar results are obtained.

Many modifications of the invention have been described. Other modifications will be apparent to those skilled in the art without departing from the inventive concept.

What is claimed is:

1. A diboradioxane of the formula

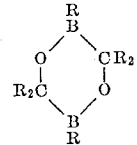

wherein R is a 1 to 12 carbon atom radical bonded to the ring through aliphatic carbon.

2. A diboradioxane of the formula

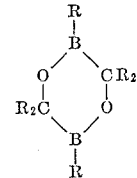

wherein R is a 1 to 12 carbon atom alkyl radical.

3. 2,3,3,5,6,6-hexaethyl-2,5-diboradioxane.

4. A process for preparing diboradioxanes and boronic acids which comprises heating a borane of the formula $R_3B$ wherein R is a 1 to 12 carbon atom radical bonded to boron through aliphatic carbon with carbon monoxide in the presence of at least about 0.5 part by weight of water per part by weight of borane at a temperature of about from 20 to 200° C. and a reaction pressure of about from 1 to 1000 atmospheres.

5. A process of claim 4 wherein said water is separated from the reaction mixture at the end of the reaction.

6. A process for the preparation of diboradioxanes which comprises heating a borane of the formula $R_3B$ wherein R is a 1 to 12 carbon atom hydrocarbon radical bonded to boron through aliphatic carbon with carbon monoxide in the presence of about from 0.5 to 10 parts by weight of water per part by weight of borane at a temperature of about from 25 to 125° C. and a reaction pressure of about from 1 to 100 atmospheres.

7. A process of claim 6 wherein the reaction temperature is about from 25 to 75° C. and the reaction pressure is 100 to 900 atmospheres.

8. A process for the preparation of boronic acids which comprises heating a borane of the formula $R_3B$ wherein R is a 1 to 12 carbon atom hydrocarbon radical bonded to boron through aliphatic carbon with carbon monoxide in the presence of about from 0.5 to 10 parts by weight of water per part by weight of borane at a temperature of about from 125 to 200° C. and a reaction pressure of about from 1 to 1000 atmospheres.

9. A process of claim 8 wherein the reaction temperature is about from 140 to 175° C. and the reaction pressure is 100 to 900 atmospheres.

References Cited by the Examiner
UNITED STATES PATENTS
3,006,961   10/1961   Reppe et al. -------- 260—606.5

CHARLES B. PARKER, *Primary Examiner.*

J. P. BRUST, *Assistant Examiner.*

UNITED STATES PATENT OFFICE
CERTIFICATE OF CORRECTION

Patent No. 3,317,580                            May 2, 1967

Melville E. D. Hillman

It is hereby certified that error appears in the above numbered patent requiring correction and that the said Letters Patent should read as corrected below.

Column 1, line 25, for "aliphalic" read -- aliphatic --; line 45, for "prodominant" read -- predominant --; column 5, line 11, for "100" read -- 1000 --.

Signed and sealed this 21st day of November 1967.

(SEAL)
Attest:

Edward M. Fletcher, Jr.                           EDWARD J. BRENNER
Attesting Officer                                     Commissioner of Patents